US009419948B2

(12) United States Patent
Gupta et al.

(10) Patent No.: US 9,419,948 B2
(45) Date of Patent: Aug. 16, 2016

(54) METHOD AND APPARATUS FOR AVOIDING LICENSE STORMING DURING AN UNPLANNED REGIONAL BLACKOUT

(71) Applicant: Adobe Systems Incorporated, San Jose, CA (US)

(72) Inventors: Piyush Gupta, New Delhi (IN); Pawan Kumar, Noida (IN); Neha Saxena, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 137 days.

(21) Appl. No.: 14/081,192

(22) Filed: Nov. 15, 2013

(65) Prior Publication Data

US 2015/0143115 A1    May 21, 2015

(51) Int. Cl.
*H04L 9/32* (2006.01)
*H04L 29/06* (2006.01)
*G06F 21/10* (2013.01)

(52) U.S. Cl.
CPC ............ *H04L 63/0428* (2013.01); *G06F 21/10* (2013.01); *H04L 63/10* (2013.01); *G06F 2221/0708* (2013.01); *G06F 2221/2145* (2013.01); *H04L 2463/101* (2013.01)

(58) Field of Classification Search
USPC ......................................................... 713/168
See application file for complete search history.

(56) References Cited

U.S. PATENT DOCUMENTS

| | | | | |
|---|---|---|---|---|
| 7,561,696 | B2 * | 7/2009 | Oliveira ................. | G06F 21/10 380/277 |
| 8,321,690 | B2 * | 11/2012 | Oliveira ................. | G06F 21/10 380/277 |
| 8,353,049 | B2 * | 1/2013 | Bromley ............... | H04L 9/0836 713/158 |
| 8,621,651 | B2 * | 12/2013 | Yin ........................ | G06F 21/10 386/230 |
| 8,739,308 | B1 * | 5/2014 | Roth et al. ...................... | 726/32 |
| 8,892,865 | B1 * | 11/2014 | Roth et al. ..................... | 713/150 |
| 2005/0251487 | A1 * | 11/2005 | Evans ..................... | G06F 21/10 705/59 |
| 2007/0199015 | A1 * | 8/2007 | Lopez .................. | H04N 7/1675 725/31 |
| 2008/0066181 | A1 * | 3/2008 | Haveson et al. ................ | 726/26 |
| 2012/0155639 | A1 * | 6/2012 | Oney .................... | H04L 9/0822 380/236 |
| 2013/0191928 | A1 * | 7/2013 | Yin et al. ........................ | 726/27 |

* cited by examiner

*Primary Examiner* — Amare F Tabor
(74) *Attorney, Agent, or Firm* — Keller Jolley Preece (57) ABSTRACT

A computer implemented method and apparatus for avoiding license storming during an unplanned regional blackout. The method comprises generating a leaf license for each geographic region of a plurality of geographic regions in a broadcast area, wherein each leaf license includes a first content encryption key for decrypting media content associated with the leaf license, and where each leaf license is bound to a root license for each geographic region in the plurality of geographic regions; and generating, in response to a blackout event, a new leaf license for each geographic region of the plurality of geographic regions that are located outside of a blackout area, wherein each new leaf license includes a second content encryption key different from the first content encryption key for decrypting protected media content, and wherein each new leaf license remains bound to the root license for each geographic region in the plurality of geographic regions.

20 Claims, 3 Drawing Sheets

METHOD AND APPARATUS FOR AVOIDING LICENSE STORMING DURING AN UNPLANNED REGIONAL BLACKOUT

BACKGROUND

1. Field of the Invention

Embodiments of the present invention generally relate to digital rights management and, more particularly, to a method and apparatus for avoiding license storming during an unplanned regional blackout.

2. Description of the Related Art

Broadcasters often deliver media on networks using Hyper Text Transfer Protocol (HTTP) streaming solutions such as HTTP Dynamic Streaming (HDS), HTTP live streaming (HLS) and Dynamic Adaptive streaming for HTTP (MPEG-DASH) to take advantage of HTTP Content Delivery Network (CDN) capabilities, efficient seeking and efficient bit rate shifting so as to enable a rich user experience. To protect their media streams from unauthorized access, broadcasters use various available digital rights management (DRM) solutions, such as ADOBE® Access that require an encryption key to decrypt protected content. The encryption key is provided to users who meet certain criteria so as to enable decryption of each segment of the protected content being streamed.

One aspect of DRM solutions includes provisions for changing the encryption key in order to enforce a regional blackout. A regional blackout occurs when a part of a live media stream is to be prevented, that is, barred from broadcast in one or more geographic regions, for example, for regulatory or governmental reasons. When such a blackout occurs without preparation, that is, it is unplanned, the encryption key is abruptly changed. In response, every media player that is currently rendering the protected content must then request the new key from a license server. Only requests from media players that are not in blackout regions are provided with the new encryption key so as to enforce the regional blackout. However, this technique is undesirable since it places a heavy request load on the license server for new encryption keys, such heavy request load being known as license storming.

Therefore, there is a need for a method and apparatus for avoiding license storming during an unplanned regional blackout.

SUMMARY

A method for avoiding license storming during an unplanned regional blackout is described. The method generates a leaf license for each geographic region of a plurality of geographic regions in a broadcast area. Each leaf license includes a first content encryption key (CEK) for decrypting media content associated with the leaf license, and is bound to a root license for each geographic region in the plurality of geographic regions. Binding of the leaf license to the root license means that the root license includes a root key that is used to encrypt the CEK. Thus, the root key is used to decrypt the CEK, which in turn decrypts the protected media content. In response to a blackout event, wherein one or more geographic regions of the plurality of geographic regions is located in a blackout area and is to be prevented from viewing the protected media content, new leaf licenses are generated for each geographic region outside of the blackout area. Each new leaf license includes a second content encryption key that is different from the first content encryption key for decrypting protected media content. Since the new leaf license is also bound to the root license, and the root license is not changed, the new leaf license is able to be decrypted by the existing root license, thereby avoid license storming.

In another embodiment, an apparatus for avoiding license storming during an unplanned regional blackout is described. The apparatus includes a license generator for generating a leaf license for each geographic region of a plurality of geographic regions in a broadcast area, where each leaf license includes a first content encryption key (CEK) for decrypting media content before a blackout event. In addition, each leaf license is bound to a root license for each geographic region in the plurality of geographic regions. The root license includes a root key that is used to decrypt the CEK, which in turn decrypts the protected media content. In response to a blackout event, the license generator generates a new leaf license for each geographic region of the plurality of geographic regions that are located outside of the blackout area, wherein each new leaf license includes a second content encryption key that is different from the first content encryption key for decrypting protected media content. Since the new leaf license is also bound to the root license, and the root license is not changed, the new leaf license is able to be decrypted by the existing root license, thereby avoid license storming.

In yet another embodiment, a computer readable medium for avoiding license storming during an unplanned regional blackout is described. The computer readable medium comprises a processor for performing instruction of a method. The method generates a leaf license for each geographic region of a plurality of geographic regions in a broadcast area. Each leaf license includes a first content encryption key (CEK) for decrypting media content associated with the leaf license, and is bound to a root license for each geographic region in the plurality of geographic regions. The root license includes a root key that is used to decrypt the CEK, which in turn decrypts the protected media content. In response to a blackout event, wherein one or more geographic regions of the plurality of geographic regions is located in a blackout area and is to be barred from viewing the protected media content, new leaf licenses are generated for each geographic region outside of the blackout area. Each new leaf license includes a second content encryption key that is different from the first content encryption key for decrypting protected media content. Since the new leaf license is also bound to the root license, and the root license is not changed, the new leaf license is able to be decrypted by the existing root license, thereby avoid license storming.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While the method and apparatus is described herein by way of example for several embodiments and illustrative drawings, those skilled in the art will recognize that the method and apparatus for avoiding license storming during an unplanned regional blackout is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for avoiding license storming during an unplanned regional blackout defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for avoiding license storming during a regional blackout. The embodiments secure a content encryption key (CEK) in a leaf license that is bound to a root license. The leaf license is provided to a media player in a manifest file, while the root license is fetched by a media player from a license server. On the media player, the root license includes a root key that is used to decrypt the CEK, which in turn decrypts the protected content.

A different leaf license and root key is created for each geographic region in a broadcast area. In addition, a different manifest file is created for each geographic region and includes region specific digital rights management (DRM) metadata. When a blackout event occurs, the CEK is rotated and the leaf license is regenerated for each region outside of the blackout region(s) so decryption of media content can continue in each region outside of the blackout region(s). The blackout regions are provided a manifest file that includes alternate content that may be viewed during a blackout period.

In non-black out regions, because the leaf license is still bound to the root license, the root license can still decrypt the leaf license, such that the protected content may be played without additional requests to a license server. In some embodiments, when a user is mobile and plays protected content in a non-blackout region, but subsequently moves to a blackout region, the protected content is blocked.

Advantageously, digital rights management technology, such as ADOBE Access can protect content during unplanned regional blackouts while avoiding license storming. Because licenses are segregated by region, the present invention provides a manifest for alternate content to a blackout region. Also, it is virtually impossible for a malicious media player in a blackout region to access the protected content because the media player is not provided a leaf license that includes the new CEK. Although the present invention avoids license storming in the event of an unplanned blackout, the method described herein may also be used during planned blackouts.

As used herein, a geographic region is a region of a broadcast area, such as a region typically defined by time boundaries, such as time zones, although or other boundaries, such as governmental jurisdictions, are also contemplated. A blackout is an event that occurs when media content is broadcast in one or more geographic regions of a broadcast area, but is to be prevented from being broadcast in one or more other regions of a broadcast area. For example, election results may be broadcast in a given region where polling is closed, but government regulation requires that such election results broadcast be prevented in regions where polling is not closed, thereby avoiding undue influence at the polls by such broadcast.

A blackout region is a region of the broadcast area where broadcast of content is to be prevented.

A content encryption key (CEK) is an encryption key used to encrypt and decrypt media content. The CEK may be a symmetric key, for example, AES-128 encryption using a 128-bit key. A leaf license is a license that contains the CEK that is encrypted using a root key. The root key may be a symmetric key. Each leaf license and root key are unique to a given geographic region in a broadcast area. In order to view encrypted media content, the root key must be used to decrypt the CEK, which in turn, decrypts the media content.

Alternate content is any content other than the media content that is to be prevented from being broadcast to a given blackout region. A blackout period is a period of time for which the blackout occurs. For example, in the case of election results, the blackout period for a given period begins when polling closes in another region and ends when polling closes in the present region.

Various embodiments of a method and apparatus for avoiding license storming during an unplanned regional blackout are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
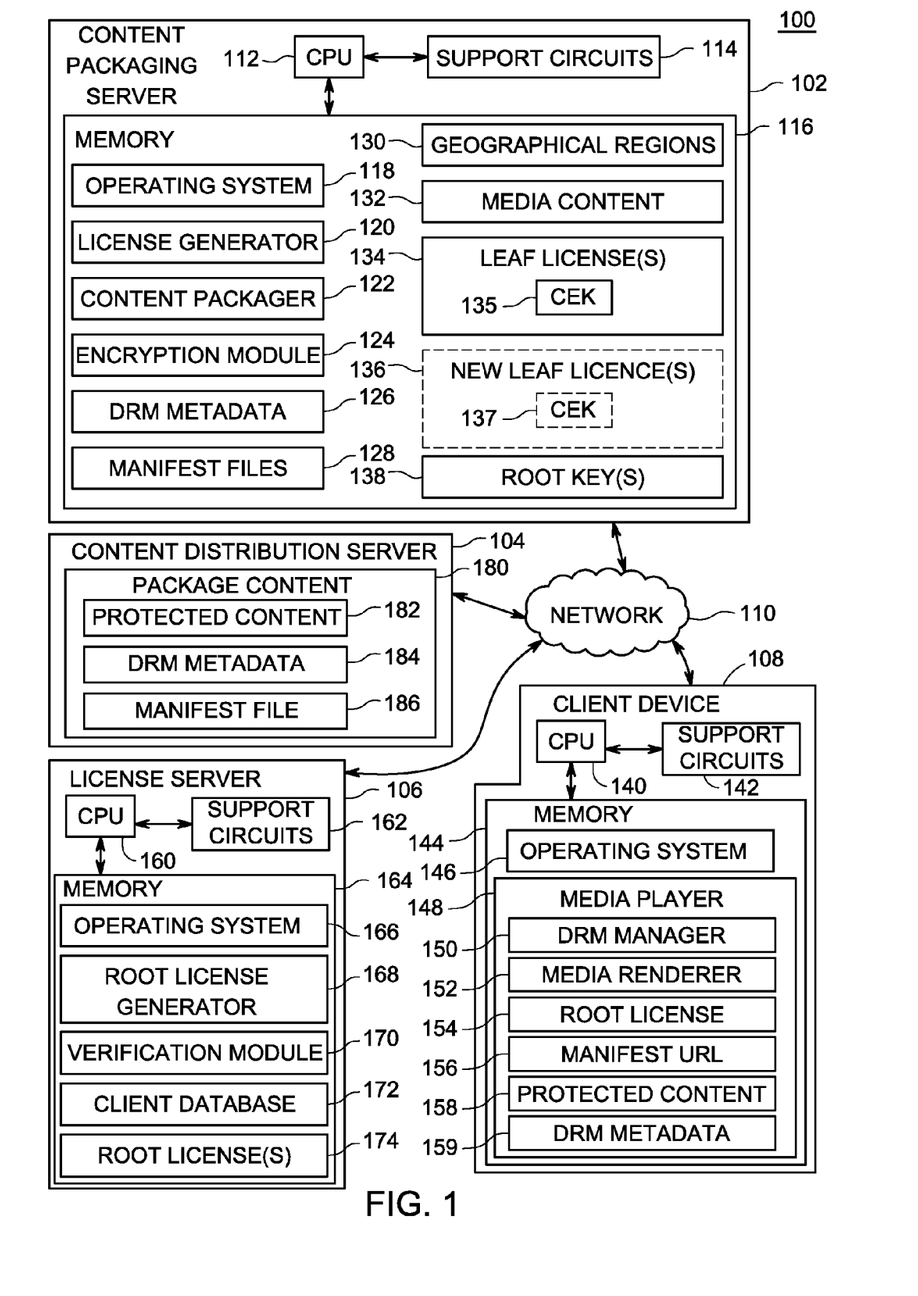
FIG. 1 is a block diagram of a system for avoiding license storming during an unplanned regional blackout, according to one or more embodiments.

FIG. 1 is a block diagram of a system 100 for avoiding license storming during an unplanned regional blackout, according to one or more embodiments. The system 100 includes a content packaging server 102, a content distributing server 104, a license server 106, and a client device 108, communicatively coupled to one another via a network 110.

The content packaging server 102 is a computing device, such as a desktop computer, laptop, tablet computer, and the like, such as ADOBE Media Server or ADOBE Primetime packager. The content packaging server 102 includes a Central Processing Unit (CPU) 112, support circuits 114, and a memory 116. The CPU 112 may include one or more commercially available microprocessors or microcontrollers that facilitate data processing and storage. The various support circuits 114 facilitate the operation of the CPU 112 and include one or more clock circuits, power supplies, cache, input/output circuits, and the like. The memory 116 includes at least one of Read Only Memory (ROM), Random Access Memory (RAM), disk drive storage, optical storage, removable storage and/or the like.

The memory 116 includes an operating system 118, a license generator 120, a content packager 122, an encryption module 124, DRM metadata 126, manifest files 128, file of geographic regions 130, media content 132, a plurality of leaf licenses 134, and in the event of a blackout event, a plurality of new leaf licenses 136, and a plurality of root keys 138. Each leaf license 134 includes a content encryption key (CEK) 135. Each new leaf license 136 includes a new CEK 137. The operating system 118 may include various commercially known operating systems. The DRM metadata 126 includes a leaf license and a universal resource locator (URL) for the license server 106. The file of geographic regions 130 includes key value pairs that include region identifiers and an associated root license for the region.

Before the media content 132 is sent to a client device 108, a content encryption key (CEK) 135 is used to encrypt the media content 132. The CEK 135 is encrypted inside of the leaf license 134 using the root key 138. As such, the root key 138 is needed to later decrypt the CEK 135 that decrypts the encrypted media content 132. The leaf license 134 and root key 138 are unique to a specific geographic region, such that when a blackout event occurs in one or more geographic regions, new leaf licenses 136 may be generated and sent to the non-blackout regions, leaving the blackout regions without the new leaf license 136 needed to decrypt the media content 132. The encrypted leaf license 134 is included in the DRM metadata 126. The manifest file 128 includes a universal resource locator (URL) that identifies the location of where to retrieve media content 132. There is a unique DRM metadata 126 and manifest file 128 for each geographic region.

The content distributing server 104 is a computing device, such as a desktop computer, laptop, tablet computer, and the like, owned by a multichannel video programming distributor site, such as COMCAST, NETFLIX, and the like. The content distributing server 104 is a repository for packaged content 180 received from the content packaging server 102. The packaged content 180 includes protected content 182, DRM metadata 184, and a manifest file 186. As described previously, there is different DRM metadata 184 and manifest file 186 for each geographic region.

The license server 106 is a computing device, such as a desktop computer, laptop, tablet computer, and the like, such as ADOBE® Access License Server. The license server 106 includes a Central Processing Unit (CPU) 160, support circuits 162, and a memory 164. The CPU 160 may include one or more commercially available microprocessors or microcontrollers that facilitate data processing and storage. The various support circuits 162 facilitate the operation of the CPU 160 and include one or more clock circuits, power supplies, cache, input/output circuits, and the like. The memory 164 includes at least one of Read Only Memory (ROM), Random Access Memory (RAM), disk drive storage, optical storage, removable storage and/or the like. The memory 164 includes an operating system 166, root license generator 168, a verification module 170, a client database 172, and root licenses 174, one root license for each geographic region of a broadcast area. The operating system 166 may include various commercially known operating systems.

The client device 108 is any computing device capable of receiving and playing streaming media content, such as a media player, a browser, and the like. The client device 108 includes a Central Processing Unit (CPU) 140, support circuits 142, and a memory 144. The CPU 140 may include one or more commercially available microprocessors or microcontrollers that facilitate data processing and storage. The various support circuits 142 facilitate the operation of the CPU 140 and include one or more clock circuits, power supplies, cache, input/output circuits, and the like. The memory 144 includes at least one of Read Only Memory (ROM), Random Access Memory (RAM), disk drive storage, optical storage, removable storage and/or the like.

The memory 144 includes an operating system 146 and a media player 148. The operating system 146 may include various commercially known operating systems. The media player 148 includes a DRM manager 150, a media renderer 152, a root license 154, and a cached manifest URL 156. The root license 154 includes a root key (not shown) that is used to decrypt the CEK in the leaf license. The CEK is used to decrypt the protected content 182 received from the content distributing server 104.

The network 110 includes a communication system that connects computers (or devices) by wire, cable, fiber optic and/or wireless link facilitated by various types of well-known network elements, such as hubs, switches, routers, and the like. The network 110 may be a part of the Intranet using various communications infrastructure, such as Ethernet, Wi-Fi, a personal area network (PAN), a wireless PAN, Bluetooth, Near field communication, and the like.

A broadcast area is divided into pre-defined geographic regions. The root license generator 168 on the license server 106 generates a root license for each geographic region of a broadcast area. For example, the broadcast area may be divided into ten regions. In such case, the root license generator 168 generates ten root licenses 174. The generated root licenses 174 include root keys that are accessed by the content packaging server 102 for use in encrypting the CEK 135 within the leaf licenses 134. The root licenses 174 are also later requested by the DRM manager 150 on the client device 108 for use in decrypting the CEK 135.

The encryption module 124 encrypts the media content 132 using a content encryption key (CEK) 135. The license generator 120 generates a leaf license 134 for each geographic region in the broadcast area. The CEK 135 is encrypted inside the leaf license 134 using the root key 138 for the geographic region that is associated with the leaf/root license pair for that region. The manifest file 128 includes a universal resource locator (URL) that identifies the location of the protected media content 182 on the content distributing server 104. When a user of the client device 108 logs into a multichannel video programming distributor website to request content, the region identifier of the media player 148 is returned along with a general manifest file that identifies a main URL for the content. The main URL is the same for all regions. The media player 148 sends a request to the content distributing server 104 at the main URL and provides the region identifier with a request. The content distributing server 104 returns the manifest file 186 specific to the geographic region identified by the region identifier provided by the media player 148.

The media player 148 then fetches the protected content 182 and DRM metadata 184 using the actual manifest for its region. If this is the first time that the media player 148 is playing the protected content 182, the media player 148 extracts the location of the license server 106 from the DRM metadata 184 and requests from the license server 106 a root license 174 that is associated with the geographic region of the media player 148.

In response to the request, the verification module 170 on the license server 106 accesses the client database 172 to ensure that the media player 148 is entitled to the root license 174. The root license generator 168 provides a root license 174 that is individualized for the media player 148. A root license 174 includes a root key (not shown) that exists for each geographic region in a broadcast area, but the root license generator 168 individualizes the root license 174 for the media player 148 by uniquely encrypting the root license 174 for a given media player 148.

The media player 148 caches the root license 154 received from the license server 106 and uses that root license 154 as required for decrypting segments of streamed protected content 182. The root license 154 contains the same root key that was used to encrypt CEK 135, where the encrypted CEK is contained in the leaf license 134 generated by the license generator 120 on the content packaging server 102. Binding of the leaf license 134 to the root license 154 means that the root license 154 is used to encrypt the CEK 135 within the leaf license 134. Thus, when a blackout event occurs, although a new leaf license 136 that includes a new CEK 137 is generated for DRM of the blackout event, the new leaf license 136 is still bound to the root license 154 and thus able to be decrypted thereby. As such, a subsequent request by media player 148 to the license server 106 for a new root license is not needed.

The DRM manager 150 uses the root key from the root license 154 to decrypt the CEK 135 from the leaf license 134, decrypts the protected content 182 and passes it to the media renderer 152 for rendering.

When a blackout event occurs, the license generator 120 rotates the CEK for the geographic regions that are outside of the blackout region. For example, if there are ten (10) geographic regions, and two of the regions are blackout regions, the license generator 120 creates a new CEK 137. The encryption module 124 encrypts the media content 132 using the new CEK 137. The content packager 122 generates new DRM metadata 126 and manifest files 128 for each geographic region. The geographic regions that are outside of the blackout area receive the DRM metadata 126 with the new leaf license 136 and a manifest file 128 that includes a URL for accessing the protected content 182. The geographic regions that are inside of the blackout area (i.e., blackout regions) are provided DRM metadata 126 that does not include the new leaf license 136, and a manifest file 128 that includes a URL for accessing alternate content that may be viewed during a blackout period. The content packager 122 packages the encrypted media content 132, DRM metadata 126, and manifest files 128. The content packager 122 then publishes the packaged content 180 at the content distributing server 104.

When a media player 148 is not located in a blackout region, the media player 148 continues to receive the protected content 158. The DRM manager 150 uses the root license 154 to decrypt the new leaf license 136 received in the DRM metadata 159 that is received from the content distributing server 104. Because the new leaf license 136 is still bound to the root license 154, meaning the root license 154 was used to encrypt the new leaf license 136, no new root license is required to decrypt the new leaf license 136, access the new CEK 137, and decrypt the protected content 158. The media renderer 152 therefore seamlessly continues to render the media content being streamed.

When a media player 148 is located within a blackout region, the media player 148 accesses the manifest URL 156, which includes a URL of alternate content for which a license is not required. The media renderer 152 renders the alternate content for the duration of the blackout period.

In the case where the media player 148 is a malicious player that accesses the protected content 182 from the content distributing server 104, the malicious player is unable to decrypt the protected content 182 because their DRM metadata 159 does not contain the new leaf license 136. As such the media player 148 is unable to gain access to the new CEK 137 and cannot decrypt the protected content 182.

Figure 2:
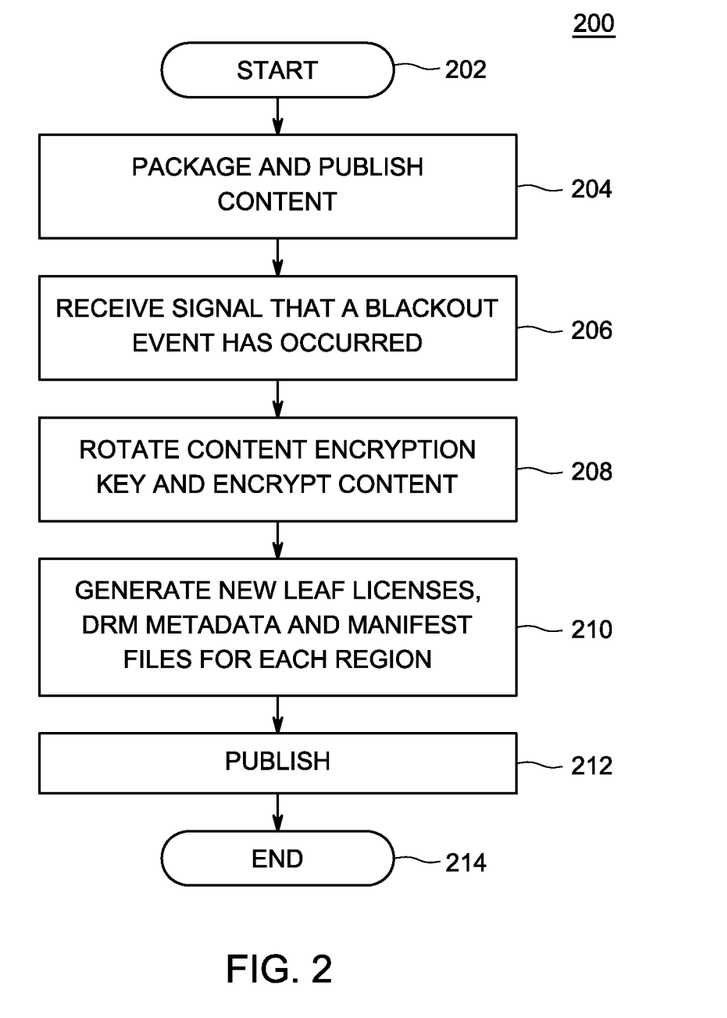
FIG. 2 depicts a flow diagram of a method for avoiding license storming during an unplanned regional blackout as performed by the license generator, encryption module and content packager of FIG. 1, according to one or more embodiments.

FIG. 2 depicts a flow diagram of a method 200 for avoiding license storming during an unplanned regional blackout as performed by the license generator 120, encryption module 124 and content packager 122 of FIG. 1, according to one or more embodiments. The method 200 packages a different set of protected content with DRM metadata and a manifest file for each geographic region in a broadcast area. When a blackout event occurs, the method 200 generates new DRM metadata and manifest files for each geographic region such that the protected content cannot be viewed in the blackout regions. The method 200 starts at step 202 and proceeds to step 204.

At step 204, the method 200 packages and publishes protected content as described in further detail with respect to FIG. 3 below. The method 200 proceeds to step 206 where the method 200 receives a signal that a blackout event has occurred. The blackout event may be signaled in-stream via a message from a media encoder to the content packager. The blackout event may be received out-of-band, for example, via java-JMX API or through HTTP REST interface, and the like.

The method 200 proceeds to step 208, where the method 200, in response to the blackout event, rotates content encryption key (CEK) and encrypts the content with the newly generated CEK. The content is encrypted with a CEK. The method 200 then uses the new CEK to encrypt the content for the geographic regions outside of the blackout area. The method 200 encrypts the new CEK differently for each geographic region. The method 200 encrypts the new CEK using a region-specific root key.

The method 200 proceeds to step 210, where the method 200 generates new leaf licenses, digital rights management (DRM) metadata and manifest files for each geographic region in the broadcast area. Each leaf license includes the new CEK. The method 200 encrypts the new CEK using the root key for the associated geographic region. The method 200 then updates the DRM metadata files for regions outside of the blackout area with the new leaf licenses. The method 200 updates the DRM metadata files for regions inside of blackout areas without a leaf license. The method 200 also updates the manifest files with the URL for the location of the content. For geographic regions outside of the blackout area, the URL provides the location of the encrypted content. For geographic regions within the blackout area, the URL provides a location of alternate content that may be viewed by the media player within the blackout area for the duration of the blackout period.

The method 200 proceeds to step 212, where the method 200 publishes the encrypted content, DRM metadata, and manifest files on a content distributing server. When a media player requests content, the request includes the media player's region identifier. The media player receives the content appropriate for the geographic region where the media player is located, whether the region is in a blackout area or not. When a blackout event occurs and the CEK is changed, a media player need not request a new license because the new leaf license that includes the CEK is still bound to the root license that is cached on the media player, thereby avoiding license storming. The method 200 proceeds to step 214 and ends.

Figure 3:
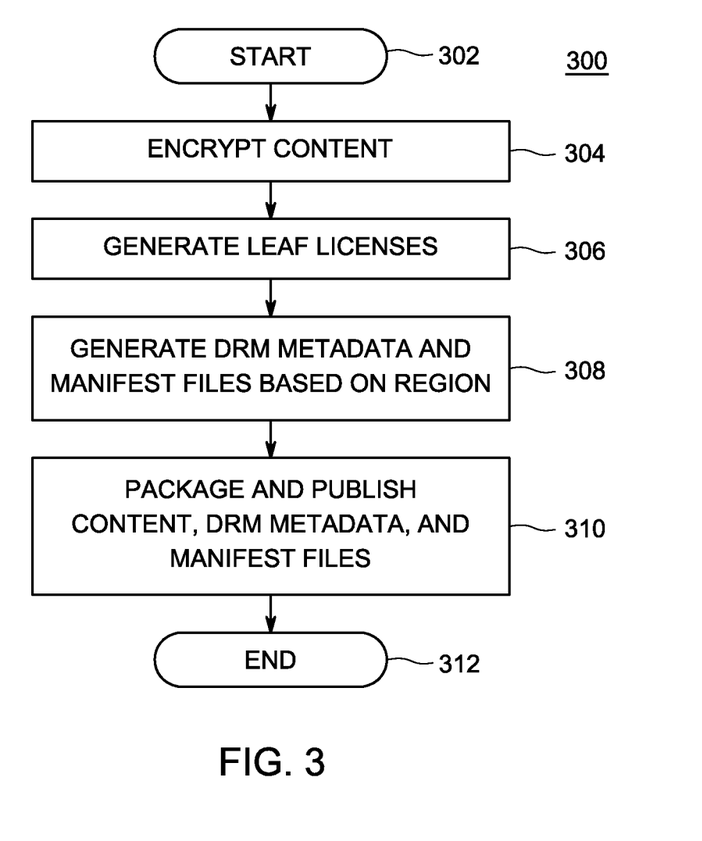
FIG. 3 depicts a flow diagram of a method for packaging and publishing content, as performed by the license generator, content packager, and encryption module of FIG. 1, according to one or more embodiments.

FIG. 3 depicts a flow diagram of a method 300 for packaging and publishing content, as performed by the license generator 120, content packager 122, and encryption module 124 of FIG. 1, according to one or more embodiments. The method 300 encrypts media content, prepares DRM metadata and manifest files for each geographic region in a broadcast area, and packages and publishes the encrypted content, DRM metadata and manifest files for all of the geographic regions in the broadcast area. The method 300 is performed initially when a broadcast begins, before a blackout event occurs. The method 300 starts at step 302 and proceeds to step 304.

At step 304, the method 300 encrypts media content. The method 300 encrypts the media content with a content encryption key (CEK). The CEK is used to encrypt the media content and upon receipt at a media player, the media content must be decrypted using the same CEK. The method 300 using license chaining to secure the CEK as described in further detail below.

The method 300 proceeds to step 306, where the method 300 generates leaf licenses, one for each geographic region in the broadcast area. The method 300 encrypts the CEK inside of the leaf license using the root key for the geographic region. The method 300 proceeds to step 308, where the method 300 generates DRM metadata and a manifest file for each geographic region in the broadcast area. The DRM metadata includes the leaf license and a URL of a license server from where a media player can request a root license. The manifest file includes a URL for where to access the encrypted content for the region where the media player resides.

The method 300 proceeds to step 310, where the method 300 packages and publishes the encrypted content, DRM metadata and manifest files for all of the geographic regions of the broadcast area. The method 300 packages the encrypted content, DRM metadata and manifest file for each region and publishes it to a content distributing server where it may be requested by a media player. The method 300 proceeds to step 312 and ends.

In an alternate embodiment, a media player can determine when it is mobile and has moved into a blackout region. The media player is able to periodically obtain its current physical geographical location from a network service provider or device-platform Application Programming Interfaces (APIs). The physical geographical location may be based on any measurement units, for example, longitude and latitude, network cell id, IP address and the like. The license server exposes a service API that is used to determine the current region ID and its boundaries based on the current physical geographical location. When a media player is mobile, for example, when a viewer of the content is on a train or bus and travels into a different geographic region, the media player recognizes when it moves into a different region.

When mobile, media playback is initiated as describe above (i.e., a media player uses a main manifest URL and region ID to generate a region specific manifest URL and fetches the manifest file. The media player extracts the DRM metadata from the manifest file and provides the metadata along with the region ID to the DRM Platform to acquire the root license.)

The DRM platform reconfirms the region ID by providing the license server with the current location and receiving the region ID, along with associated physical geographical boundary, in response. The DRM platform matches the region ID provided by the media player with the region ID provided by the license server. If the region IDs match, the DRM platform sends a request to the license server to acquire a root license. The licenser server validates the mapping of the region ID and a root license ID (present in the leaf license of the DRM metadata). If the region ID and root license ID match, the license server responds with a valid root license. The DRM platform uses the root license to derive the CEK from the leaf license to enable playback of the media content.

The DRM platform monitors the region boundary such that it can determine if crossing a region boundary results in entry to a blackout region. In some embodiments, the DRM platform continuously polls its current location through the API exposed by the device platform or network service provide and determines if it is contained within the current region boundary received from the license server. In some embodiments, the DRM platform registers itself to a call back service (by providing the current region boundary) of the device platform. The DRM platform receives notification when the device crosses a region boundary.

When a region boundary is crossed, the DRM platform provides the current location to the license server and receives its new region ID in response. The DRM platform sends notification to the media player that the client device has moved to a new region. The DRM platform may send a notification that the current license will expire within a predetermined grace period, for example 1 or 2 minutes.

The media player, within the grace period, fetches the manifest file associated with the new region ID and extracts the DRM metadata from the manifest file. The media player provides the DRM metadata to the DRM platform along with the region ID, at which time the DRM platform reconfirms (if it is not already cached for the current physical region boundary) the region ID with the license server as described above.

Again, the DRM platform matches the region ID provided by the player with the one received from the license server. If there is a match, playback of the media content continues. However, if after expiry of the grace period, a valid root license is not received (i.e., the media player has moved into a blackout region), playback of the media content stops. As such, even though a user may initially be located in a non-blackout region, if the user moves to a blackout region, the protected content is blocked.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of avoiding license storming during an unplanned regional blackout comprising:
    generating, by one or more servers, a first leaf license for each geographic region of a plurality of geographic regions in a broadcast area, wherein each first leaf license for each geographic region includes a first content encryption key for decrypting media content associated with the first leaf license, and where each first leaf license for each geographic region is bound to a root license for each geographic region in the plurality of geographic regions;
    generating, by the one or more servers in response to a blackout event and without regard to receipt of any license requests, a second leaf license for each geographic region of the plurality of geographic regions that are located outside of a blackout area, wherein each second leaf license for each geographic region includes a second content encryption key different from the first content encryption key for decrypting protected media content, and wherein each second leaf license for each geographic region remains bound to the root license for each geographic region in the plurality of geographic regions; and
    publishing the second leaf license for each geographic region to client devices located outside of the blackout area prior to receiving a license request from the client devices due to the blackout event.

2. The method of claim 1, further comprising:
    encrypting media content using the first content encryption key;
    generating digital rights management (DRM) metadata for each geographic region of the plurality of geographic regions, wherein the DRM metadata comprises the first leaf license for a given geographic region of the plurality of geographic regions;
    generating a manifest file for each geographic region of the plurality of geographic regions, wherein the manifest file comprises a universal resource locator (URL) of the location of the media content for broadcast to the geographic region; and
    publishing the encrypted media content, the DRM metadata, and the manifest file for each geographic region in the plurality of geographic regions.

3. The method of claim 1, wherein after the blackout event, the method of claim 1 further comprises:
    encrypting media content using the second content encryption key;
    for each of one or more geographic regions within the blackout area:

generating first digital rights management (DRM) metadata wherein the first DRM metadata does not include a leaf license;
generating a first manifest file comprising a universal resource locator (URL) of a location of alternate content that may be viewed during a blackout period;
for each geographic region of the plurality of geographic regions outside of the blackout area:
generating second digital rights management (DRM) metadata wherein the second DRM metadata includes the second leaf license, wherein the second leaf license includes an encrypted second content encryption key;
generating a second manifest file comprising a universal resource locator (URL) of a location of protected content for a geographic region; and
publishing the encrypted media content, the second DRM metadata, and the first and second manifest files for each geographic region in the plurality of geographic regions outside of the blackout area.

4. The method of claim 3, wherein the second leaf license for each geographic region remains bound to the root license for the geographic region after the blackout event occurs.

5. The method of claim 1, wherein the root license comprises a root key for a geographic region, wherein the root key decrypts the first content encryption key, wherein the first content encryption key decrypts protected content broadcast to the geographic region.

6. The method of claim 1, wherein a second root license is not needed to decrypt the second leaf license, thereby avoiding a request for the second root license to a license server.

7. The method of claim 2, wherein a content encryption key rotation is signaled in each manifest file at a start and end of each blackout period.

8. An apparatus comprising:
at least one processor; and
a storage medium storing instructions, that when executed by the at least one processor, cause the apparatus to perform a method of avoiding license storming during an unplanned regional blackout comprising:
generating a first leaf license for each geographic region of a plurality of geographic regions in a broadcast area, wherein each first leaf license for each geographic region includes a first content encryption key for decrypting media content associated with the first leaf license before a blackout event, and where each first leaf license for each geographic region is bound to a root license for each geographic region in the plurality of geographic regions;
generating a second leaf license when the blackout event occurs and without regard to receipt of any license requests, for each geographic region of the plurality of geographic regions that are located outside of a blackout area, wherein each second leaf license for each geographic region includes a second content encryption key different from the first content encryption key for decrypting protected media content, and wherein each second leaf license for each geographic region remains bound to the root license for each geographic region in the plurality of geographic regions; and
publishing the second leaf license for each geographic region to client devices located outside of the blackout area prior to receiving a license request from the client devices due to the blackout event.

9. The apparatus of claim 8, wherein the method further comprises:

encrypting media content using the first content encryption key;
generating digital rights management (DRM) metadata for each geographic region of the plurality of geographic regions, wherein the DRM metadata comprises the first leaf license for a given geographic region of the plurality of geographic regions;
generating a manifest file for each geographic region of the plurality of geographic regions, wherein the manifest file comprises a universal resource locator (URL) of the location of the media content for broadcast to the geographic region; and
publishing the encrypted media content, the DRM metadata, and the manifest file for each geographic region in the plurality of geographic regions.

10. The apparatus of claim 9, wherein the method further comprises:
encrypting the media content using the second content encryption key after the blackout event; and
for each of one or more geographic regions within the blackout area:
generating first digital rights management (DRM) metadata wherein the first DRM metadata does not include a leaf license;
generating a first manifest file comprising a universal resource locator (URL) of a location of alternate content that may be viewed during a blackout period;
for each geographic region of the plurality of geographic regions that are located outside of the blackout area:
generating second digital rights management (DRM) metadata wherein the second DRM metadata includes the second leaf license, wherein the second leaf license includes an encrypted second content encryption key;
generating a second manifest file comprising a universal resource locator (URL) of a location of protected content for a geographic region; and
publishing the encrypted media content, the second DRM metadata, and the first and second manifest files for each geographic region in the plurality of geographic regions.

11. The apparatus of claim 10, wherein the second leaf license for each geographic region remains bound to the root license for the geographic region after the blackout event occurs, such that a second root license is not needed to decrypt the second leaf license, thereby avoiding a request for a second root license to a license server.

12. The apparatus of claim 8, wherein the root license comprises a root key for a given geographic region, wherein the root key decrypts the first content encryption key, wherein the first content encryption key decrypts protected content broadcast to the given geographic region.

13. The apparatus of claim 9, wherein a content encryption key rotation is signaled in each manifest file at a start and end of each blackout period.

14. A non-transitory computer readable medium for storing computer instructions for avoiding license storming during an unplanned regional blackout that, when executed by at least one processor, cause a computer system to:
generate a first leaf license for each geographic region of a plurality of geographic regions in a broadcast area, wherein each first leaf license for each geographic region includes a first content encryption key for decrypting media content associated with the first leaf license, and where each first leaf license for each geographic region is bound to a root license for each geographic region in the plurality of geographic regions;

generate, in response to a blackout event, a second leaf license for each geographic region of the plurality of geographic regions that are located outside of a blackout area, wherein each second leaf license for each geographic region includes a second content encryption key different from the first content encryption key for decrypting protected media content, and wherein each second leaf license for each geographic region remains bound to the root license for each geographic region in the plurality of geographic regions; and publish the second leaf license for each geographic region to client devices located outside of the blackout area prior to receiving a license request from the client devices due to the blackout event.

15. The non-transitory computer readable medium of claim 14, further comprising instructions, that when executed by the at least one processor, cause the computer system to:

encrypt media content using the first content encryption key;

generate digital rights management (DRM) metadata for each geographic region of the plurality of geographic regions, wherein the DRM metadata comprises the first leaf license for a given geographic region of the plurality of geographic regions;

generate a manifest file for each geographic region of the plurality of geographic regions, wherein the manifest file comprises a universal resource locator (URL) of the location of the media content for broadcast to the geographic region; and publish the encrypted media content, the DRM metadata, and the manifest file for each geographic region in the plurality of geographic regions.

16. The non-transitory computer readable medium of claim 14, further comprising instructions, that when executed by the at least one processor, cause the computer system, after the blackout event, to:

encrypt media content using the second content encryption key;

for each of one or more geographic regions within the blackout area:

generate first digital rights management (DRM) metadata wherein the first DRM metadata does not include a leaf license; and generate a first manifest file comprising a universal resource locator (URL) of a location of alternate content that may be viewed during a blackout period;

for each geographic region of the plurality of regions outside of the blackout area:

generate second digital rights management (DRM) metadata wherein the second DRM metadata includes the second leaf license, wherein the second leaf license includes an encrypted second content encryption key;

generate a first manifest file comprising a universal resource locator (URL) of a location of protected content for a geographic region; and publish the encrypted media content, the second DRM metadata, and the first and second manifest files for each geographic region in the plurality of geographic regions outside of the blackout area.

17. The non-transitory computer readable medium of claim 16, wherein the second leaf license for each geographic region remains bound to the root license for the geographic region after the blackout event occurs.

18. The non-transitory computer readable medium of claim 14, wherein the root license comprises a root key for a geographic region, wherein the root key decrypts the first content encryption key, wherein the first content encryption key decrypts protected content broadcast to the geographic region.

19. The non-transitory computer readable medium of claim 14, wherein a second root license is not needed to decrypt the second leaf license, thereby avoiding a request for the second root license to a license server.

20. The non-transitory computer readable medium of claim 15, wherein a content encryption key rotation is signaled in each manifest file at a start and end of each blackout period.

* * * * *